United States Patent [19]

Acre

[11] 4,279,273
[45] Jul. 21, 1981

[54] CLUTCH RETENTION FEATURE OF A HAND CONTROL VALVE

[75] Inventor: Leon R. Acre, Ovid, Mich.

[73] Assignee: Midland-Ross Corporation, Cleveland, Ohio

[21] Appl. No.: 118,617

[22] Filed: Feb. 4, 1980

[51] Int. Cl.³ .................. F16K 11/00; F16K 31/00
[52] U.S. Cl. .................... 137/627.5; 251/253; 251/297
[58] Field of Search ............... 251/251, 297, 252, 253; 137/627.5

[56] References Cited

U.S. PATENT DOCUMENTS

| | | | |
|---|---|---|---|
| 2,572,507 | 10/1951 | Mueller | 251/297 |
| 2,590,550 | 3/1952 | Lomar | 251/297 |
| 3,306,572 | 2/1967 | Dove | 251/297 |
| 3,602,340 | 8/1971 | Budzich et al. | 251/297 |
| 3,927,916 | 12/1975 | Masuda | 137/627.5 |
| 3,937,250 | 2/1976 | Golan et al. | 251/297 |

Primary Examiner—A. Michael Chambers
Attorney, Agent, or Firm—Richard A. Negin

[57] ABSTRACT

The present invention is an improved clutch retention feature of a hand control valve. The hand control valve has a rotatable control member and a stationary member. There is a rotatable plate or disc which interlocks with the rotatable hand control member and a stationary plate or disc which interlocks with the stationary member. Adjacent surfaces of the stationary and rotatable plates are in sufficient frictional contact to maintain the hand control valve in the position set against system forces and yet be overcome by hand rotation of the rotatable control member.

4 Claims, 8 Drawing Figures

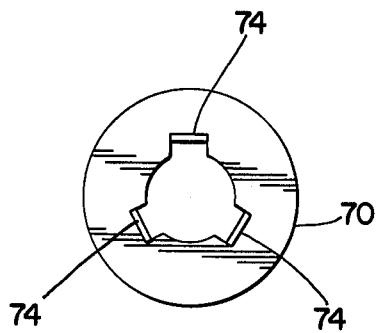
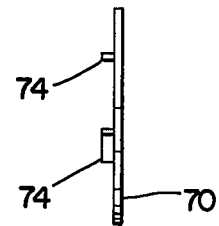
Fig. 3        Fig. 4
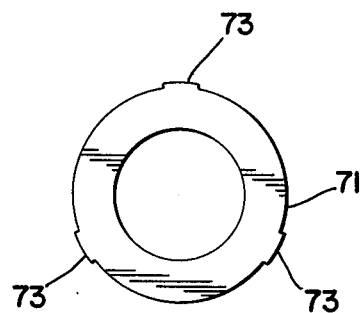
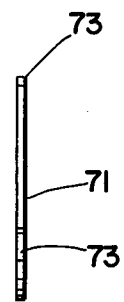
Fig. 5        Fig. 6

CLUTCH RETENTION FEATURE OF A HAND CONTROL VALVE

BACKGROUND OF THE INVENTION

This invention is in the field of hand control valves; more particularly, the invention relates to a hand control valve having a unique clutch retention feature.

In the manual operation of various hand control valves, particularly hand control valves used in tractor-trailer vehicles, there is a requirement that the control lever or knob remain in the position selected by the operator. This can be accomplished by having a frictional element such as an O-ring between a stationary portion of the valve and a rotatable portion of the valve which is connected to the knob or lever. The stationary portion is forced against the frictional element which is in contact with the rotatable element so as to maintain the necessary frictional forces to maintain the set position of the hand control valve knob.

An early attempt to retain the setting of a globe valve is described in U.S. Pat. No. 72,868 in which a spring is attached at one end to a nonrotatable socket portion of the globe valve. The opposite end of the spring is attached to a friction clamp which is forced against the rotatable globe valve wheel or knob.

U.S. Pat. No. 2,711,191 discloses a spring biased against a rotatable washer which presses against a nonrotatable cap. There is not complete contact between adjacent surfaces of the washer and the cap. The cap has depressions into which bumps in the washer snap under the action of the spring to maintain the valve in its desired set position.

U.S. Pat. No. 2,510,393 discloses the use of a spring and washer combination in a cam valve to tend to close the valve. The spring operates to automatically maintain a rotatable washer in constant engagement with a nonrotatable washer. However, this arrangement tends to force the handle into a predetermined position rather than maintain it at any given set position.

Additionally of interest is U.S. Pat. No. 824,527 which shows the use of a spring mechanism to maintain a screw at a desired setting and U.S. Pat. No. 3,940,107 which discloses a rotary valve spring clutch.

There is a need to provide a means by which a hand control valve can be maintained at a particular setting. This is particularly important in cam-type valves in which fluid under pressure enters a chamber in the valve. In this case, there is a tendency for the valve to move in a direction to relieve the pressure. As noted, one way to maintain the valve in a desired set position is by the use of a frictional element such as an O-ring between rotatable and nonrotatable portions of the valve. However, in many operations an O-ring or similar elastomeric device does not exhibit constant properties with changing atmospheric conditions or exposure to wet, dry or oily environments. Further, the elastomeric-type frictional devices wear out. It is desirable to have a hand control valve having an improved clutch retention device to maintain it in a set position.

SUMMARY OF THE INVENTION

The present invention is an improvement in hand control valves. More particularly, the present invention is an improved clutch retention feature of a hand control valve. The hand control valve has a rotatable control member and a stationary member. There is a rotatable plate which interlocks with the rotatable hand control member and a stationary plate which interlocks with the stationary member. A radial surface of the rotatable plate and a radial surface of the stationary plate are slidingly in contact. Movement of the rotatable plate relative to the stationary plate requires the overcoming of the frictional forces of the contact. There is a means which forces the rotatable plate toward the stationary plate to assure that there is sufficient contact between their adjacent radial surfaces to maintain a minimum frictional force to be overcome in order for the rotatable plate to rotate relative to the stationary plate. The force of a hand turning the rotatable hand control member is sufficient to overcome the frictional force between the rotatable and stationary plates. However, the frictional force is sufficient to maintain the rotatable hand control member in the desired set position.

Thus, it is a general object of the present invention to provide a new and improved hand control valve having a clutch retention feature which will maintain a given setting of the valve. It is an object of the present invention to provide a clutch retention feature which is resistant to changing atmospheric conditions and environments. It is another object of the present invention to provide a clutch retention feature which is highly resistant to wear. It is another object of the present invention to provide a cam-type hand control valve of the type which opens to a high pressure fluid such as liquid or gas which enters the valve and increases the frictional forces of the clutch retention feature thereby overcoming the tendency of the increased pressure within the hand control valve to force the cam to move in a direction to relieve the pressure.

It is an object of this invention to obtain one or more of the objects set forth above. These and other objects and advantages of this invention will become apparent to those skilled in the art from the following specification and claims, reference being had to the attached drawings.

BRIEF DESCRIPTION OF THE DRAWINGS

FIG. 3 is a face view of the rotatable disc of the embodiment in FIG. 2.

FIG. 4 is a side view of the rotatable disc of the embodiment in FIG. 2.

FIG. 5 is a face view of the stationary disc of the embodiment in FIG. 2. FIG. 6 is a side view of the stationary disc of the embodiment in FIG. 2.

DESCRIPTION OF THE PREFERRED EMBODIMENTS

Figure 1:
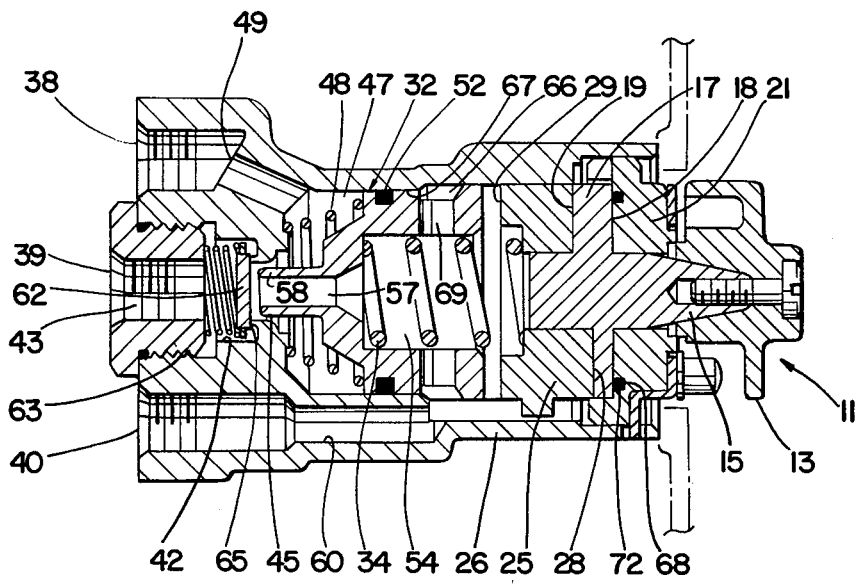
FIG. 1 is a sectional view of a hand control valve showing a prior art clutch retention O-ring.

The present invention will be more easily understood by reference to FIG. 1. FIG 1 is a sectional view of a hand control valve using a prior art clutch retention O-ring. The hand control valve shown in FIG. 1 is similar to the type used to illustrate the clutch retention feature of the present invention shown in FIGS. 2 through 8. The valve shown is used to control air flow, although the invention can be used in valves with fluids other than air.

FIG. 1 shows a trailer hand control valve of the type in which there is a requirement that the control lever or knob remain in a position selected by the operator while maintaining the selected delivered air pressure. The hand control valve has a rotatable hand control member generally shown as reference character 11. The rotatable hand control member further comprises a knob 13 or lever. An axial extension 15 extends from the knob 13. The axial extension 15 can be one integral piece with the knob or a separate piece attached to the knob as shown in FIG. 1. There is a radial extension 17 from the axial extension 15. The radial extension 17 has a knob side face 18 and an opposite knob side face 19. The axial extension 15 passes from knob 13 through a stationary member 21. The stationary member is between knob 13 and the radial extension knob side face 18.

In typical hand control valves of the type shown in FIG. 1, rotation of the knob 13 causes a response in the components of the valve. The rotation of knob 13 in the hand control valve shown in FIG. 1 results in an axial movement within the valve which can be used as a control feature. The radial extension opposite knob side face 19 has a cammed surface. The cammed surface is variable in the axial direction. The rotation of the radial extension opposite knob side face 19, as knob 13 is rotated, causes axially sliding piston 25 to move axially within valve housing 26. The axially sliding piston 25 has a piston knob side face 28 and a piston opposite knob side face 29. The piston knob side face 28 has a cammed surface corresponding to the radial extension opposite knob side face 19. The piston opposite knob side face 29 can be a radial surface perpendicular to the axis of the axial extension. Therefore, rotation of the knob 13 is translated into an axial movement of piston opposite knob side face 29. This axial movement can be translated into the functional operation of a hand control valve.

The axially sliding piston 25 slides within valve housing 26. In the hand control valve used to illustrate the present invention, there is a valve seat piston generally shown as reference character 32 which slides axially in housing 26. There is a biasing means such as piston spring 34 between axially sliding piston 25 and valve seat piston 32. Rotation of knob 13 operatively acts through the cammed surface of radial extension opposite knob side face 19, through axially sliding piston 25 against piston spring 34 to impart axial movement to valve seat piston 32. Valve seat piston 32 can thereby cause the desired control response to the rotation of knob 13.

There are three ports through the housing 26, a delivery port 38, a fluid inlet port 39 and an exhaust port 40. Fluid inlet port 39 communicates to a valve seat chamber 42 through inlet passage 43. Valve opening 45 is between valve seat chamber 42 and valve chamber 47. Delivery port 38 communicates to valve chamber 47 through delivery passage 49.

The valve seat piston 32 sealingly slides axially in housing 26. There can be a sealing means such as valve seat piston O-ring 52 between the valve seat piston 32 and the housing 26. The valve seat piston 32 further has a valve seat piston chamber 54 facing the piston opposite knob side face 29 of the axially sliding piston 25. Piston spring 34 is located between the piston opposite knob side face 29 and the valve seat piston 32 in valve seat piston chamber 54. Valve seat piston chamber 54 communicates with valve chamber 47 through valve seat piston passage 57 in valve seat piston stem 58. The valve seat piston stem 58 is an axial stem directed into valve opening 45. The valve seat piston chamber 54 communicates to exhaust port 40 through exhaust passage 60 and passages 69.

A valve seat 62 is biased by valve seat spring 63 against valve opening lip 65. The valve as shown in FIG. 1 is in a position where valve seat 62 is against valve opening lip 65 closing communication between fluid inlet port 39 and valve opening 45. In this position, delivery port 38 communicates, through delivery passage 49, to valve chamber 47, through valve seat piston passage 57, to valve seat piston chamber 54, through passages 69 to exhaust passage 60. The valve seat piston chamber 54 communicates through a space between axially sliding piston 25 and valve seat piston 32 to exhaust passage 60. In the position shown, air is prevented from entering through inlet port 39, and the delivery port 38 is open to the exhaust port 40, as in the valve seat piston chamber 54.

When the hand control knob 13 is rotated, the cammed surface of the radial extension opposite knob side face 19 acts against the corresponding cammed surface of piston knob side face 28 to force axially sliding piston 25 toward the valve seat piston 32. The valve seat piston 32 moves axially away from knob 13 and toward valve seat 62. The valve seat piston stem 58 intercepts valve seat 62 and forces it against valve seat spring 63 and away from valve opening lip 65. This closes communication from valve seat piston passage 57 to exhaust passage 60. A passage is then opened for communication from fluid inlet port 39, through inlet passage 43, valve seat chamber 42, valve opening 45, valve chamber 47, delivery passage 49 and out through delivery port 38. The space between valve seat piston 32 and piston opposite knob side face 29 controls the delivered air characteristics. Thus, control continues until piston opposite knob side face 29 intercepts valve seat piston 32.

When the knob is returned to the exhaust position as shown in FIG. 1, a valve chamber spring 48, between the housing 26 and the valve seat piston 32, forces valve seat piston 32 against piston spring 34. The valve seat piston 32 moves against piston spring 34 until valve seat piston channel 66 intercepts exhaust passage 60, and there is communication between valve chamber 47, through valve seat piston passage 57, to valve seat piston chamber 54, through valve seat piston channel 66, through passages 69, and exhaust passage 60 to exhaust port 40.

In the prior art, the need was recognized to maintain the knob 13 in a position as originally intended and set. This is important in valves of the type shown in FIG. 1 where there are cammed surfaces and chambers with fluid under pressure acting against the cammed surfaces to relieve the pressure. O-ring 68 is used as a friction device between stationary member 21 and the radial extension knob side face 18. The O-ring shown is located in O-ring channel 72 in the stationary member 21.

During operation of this hand control valve, it is desired to maintain the knob 13 in position as originally intended and manually set. The present invention is an improved clutch retention feature which can generally be used in hand control valves. The hand control valve used to show the prior art frictional device is used to illustrate the clutch retention feature of the present invention. It is not the inventor's intent to limit the clutch retention feature of the present invention to the specific hand control valve shown but merely to use it for illustrative purposes. The preferred embodiment of the clutch retention feature of the present invention is shown in FIGS. 2 through 6.

In its most basic form, the present invention is a hand control valve which has a rotatable hand control member 11' and a stationary member 21'. There are two plates, a rotatable plate and a stationary plate, between stationary member 21' and rotatable hand control member 11'. The rotatable plate interlocks with, or can be connected to, the rotatable hand control member 11' and the stationary plate interlocks with, or can be connected to, the stationary member 21'. The rotatable plate has one rotatable radial surface and an opposite rotatable radial surface, and the stationary plate has one stationary radial surface and an opposite stationary radial surface. One stationary radial surface is slidingly in contact with one rotatable radial surface. There is a means to force the rotatable plate toward the stationary plate so that there is a frictional force at the point where the stationary radial surface and the one rotatable radial surface are in contact to prevent movement of the plates relative to one another by system forces. However, the frictional forces of the plates relative to one another can be overcome by the force of a hand on the rotatable hand control member.

Figure 2:
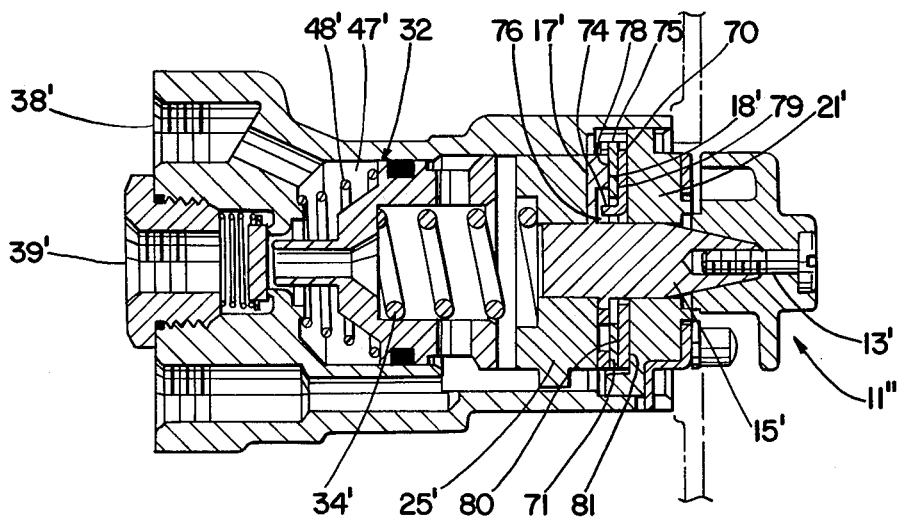
FIG. 2 is a sectional view of a hand control valve with the preferred embodiment of the present invention.

More particularly, the preferred embodiment of the present invention is shown in FIGS. 2 through 6. As indicated, the same type of hand control valve operating similarly to that shown in FIG. 1 is used to illustrate the present invention. The O-ring friction device 68 of FIG. 1 is replaced with the clutch retention feature of the present invention. In this embodiment, the rotatable plate is a rotatable disc 70 having an axial hole, and the stationary plate is a stationary disc 71 also having an axial hole. The stationary disc 71 interlocks with the stationary member 21' or other suitable stationary portions such as housing 26'. As shown in FIG. 2, stationary disc 71 is located adjacent to the radial extension knob side face 18' and interlocks by stationary keys 73 into stationary keys holes 75 of stationary member 21'. The stationary disc 71 is located between the radial extension 17' and the stationary member 21', with the axial extension 15' from the knob 13' passing through the axial hole in the stationary disc 71.

The rotatable disc 70 is located between the stationary disc 71 and the stationary member 21'. The rotatable disc is keyed to the rotatable hand control member 11'. The rotatable disc can be keyed to the axial extension 15'. Preferably, there is a rotatable key 74 connected to the circumference of the axial hole through rotatable disc 70 and passing axially through the axial hole of stationary disc 71 into rotatable key hole 76 of radial extension 17'. The rotatable disc 70 is located between the stationary disc 71 and the stationary member 21' with the axial extension 15' from the knob 13' passing through the axial hole of the rotatable disc.

The stationary disc 71 has a stationary disc radial extension side 78 and a stationary disc knob side 79, and the rotatable disc 70 has a rotatable disc radial extension side 80 and a rotatable disc knob side 81. Preferably, the stationary disc 71 is located so that the stationary disc radial extension side 78 is adjacent to the radial extension knob side 18', and the stationary disc knob side 79 is adjacent to the rotatable disc radial extension side 80. The rotatable disc knob side 81 is adjacent to a corresponding surface of stationary member 21'. In this way, the preferred embodiment has a multiple disc braking effect. The surfaces between the rotatable radial extension 17' and the stationary disc 71, the stationary disc 71 and the rotatable disc 70, and the rotatable disc 70 and the stationary member 21' frictionally resist rotatable movement. There is a maximum surface area with a minimum amount of rotatable disc area for friction forces to act against relative movement of the discs.

The rotatable discs used in the present invention are made of a suitable material so that they are unaffected by the environment or upon exposure to oil and are wear resistant. Examples of such material are metal discs. The disc materials can be varied depending on the environment to which they are exposed, and to meet desired frictional holding force parameters. The discs can be made of various metals or plastics. In the same valve, the rotatable and stationary discs can be made of the same or different materials. Typical disc materials include but are not limited to steel, copper, aluminum and nylon.

Additionally, because there is an extensive frictional surface area compared to the prior art O-ring used, the clutch retention feature of the present invention can take advantage of hand control valves as shown in FIG. 2 in which the fluid pressure, i.e., air pressure, in the valve increases the frictional forces between the stationary disc 71, the rotatable disc 70, the stationary member 21' and radial extension knob side face 18'. Opening the fluid inlet port 39' into communication with the delivery port 38', results in pressure in valve chamber 47' acting through valve seat piston 32', against piston spring 34'. This forces the axial sliding piston 25' against radial extension 17' to increase the frictional resistance forces of the rotatable and stationary discs cooperating at their common surface and at the surfaces between the discs and the stationary member 21' and the radial extension 17'. As with the prior art hand control valve, a suitable biasing means such as valve chamber spring 48' acts against valve seat piston 32', which in turn acts on piston spring 34', which forces axially sliding piston 25' against radial extension 17', to provide the necessary frictional contact between radial extension 17', rotatable disc 70, stationary disc 71 and stationary member 21'.

Figure 7:
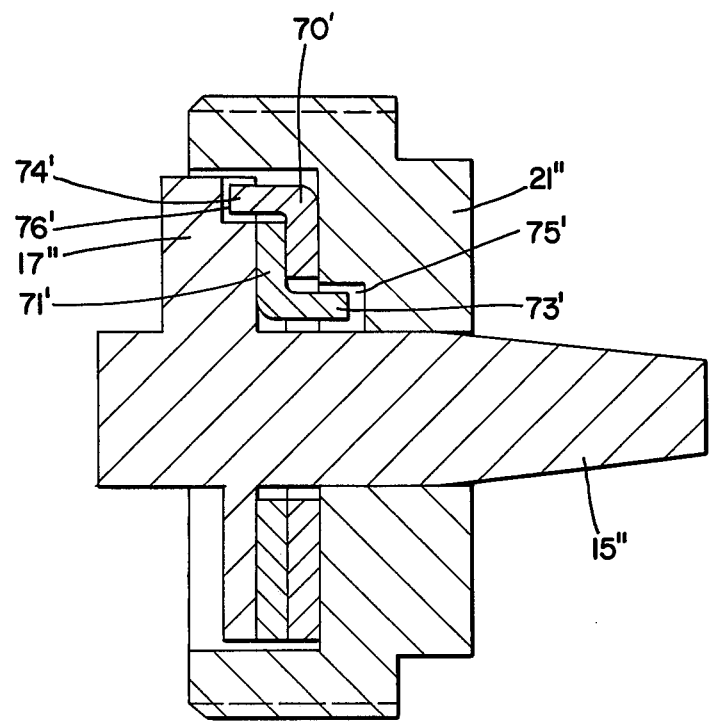
FIG. 7 is a partial, schematic sectional view of an alternate embodiment of the present invention.
Figure 8:
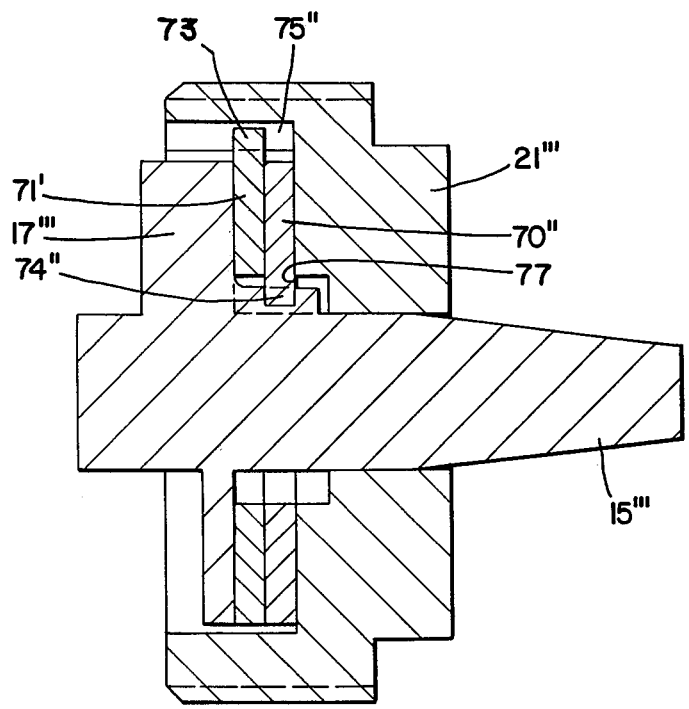
FIG. 8 is a partial, schematic sectional view of an alternate embodiment of the present invention.

FIGS. 7 and 8 show partial, schematic sectional views of alternate embodiments of the present invention where the discs have different key structures. FIG. 7 shows rotatable disc 70', having axially extending rotatable keys 74' at the outer rotatable disc circumference keyed to rotatable key holes 76' in the radial extension 17" of axial extension 15". Stationary disc 71' has axially extending stationary keys 73' at the inner stationary disc circumference keyed to stationary key holes 75' of stationary member 21".

FIG. 8 shows rotatable disc 70", having radially extending rotatable keys 74" at the inner rotatable disc circumference keyed to rotatable key holes 76" in the axial extension 15'". Stationary disc 71" has radially extending stationary keys 73" at the outer stationary disc circumference keyed to stationary key holes 75" in stationary member 21'". Rather than interlocking discs to corresponding members, the discs can be connected or fastened to corresponding members by suitable means such as screws or welds.

Modifications, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance of which the invention has promoted the art.

What is claimed is:

1. A hand control valve, comprising:
   (a) a stationary member having an opening extending therethrough, the member having a flat, annular friction surface surrounding the opening;
   (b) a rotary member which extends through the opening in the stationary member and which is rotatable, by hand, the rotary member including a flat, annular friction surface which is in confronting spaced relation from the friction surface of the stationary member;
   (c) means biasing said rotary member toward said stationary member;
   (d) at least one pair of annular friction plates disposed between the friction surfaces of the stationary and rotary members, the friction plates, when compressed against each other and the stationary and rotary members, providing frictional resistance to rotation of the rotary member, each friction plate having a pair of parallel, flat, annular friction surfaces for engaging adjacent flat friction surfaces of a plate and member;
   (e) means for keying one of the pair of friction plates to the stationary member for limited rotational movement relative thereto; and
   (f) means for keying the other of the pair of friction plates to the rotary member for limited rotational movement relative thereto;
   (g) valving means coacting with means on said rotary member and movable toward and away from said stationary member in response to rotation of said rotary member.

2. The valve of claim 1, wherein:
   (I) said means on said rotary member includes a camming surface carried by the rotary member in opposed relation to the friction surface thereof;
   (II) said valving means includes a piston adjacent the rotary member in farther spaced relation from the stationary member and having a camming surface matingly engaging the camming surface of the rotary member, the camming surfaces of the piston and rotary member coacting to move the piston from the stationary member when the rotary member is rotated in a direction opposite said one direction; and
   (III) said biasing means includes a spring engaging the piston and exerting a force thereagainst in the direction of the rotary member.

3. The valve of claim 2, wherein the keying means (e) and (f) include means for keying the friction plate, closer the stationary member, to the rotary member, and means for keying the friction plate, closer the rotary member, to the stationary member.

4. A hand control valve, comprising:
   (a) a housing having a first, longitudinally extending chamber in communication with a smaller, axially aligned second chamber;
   (b) a stationary, unrotatable member secured at one end of the housing and extending transversely across the first chamber, the stationary member having an opening extending longitudinally therethrough;
   (c) means for sealing the first chamber from the second chamber, including a first valve for sealing engagement with a first valve seat and means for biasing the first valve in sealing engagement against the first valve seat;
   (d) a first inlet port in communication with the first chamber;
   (e) an exhaust port in communication with the first chamber in spaced relation from the first inlet port;
   (f) a second inlet port in communication with the smaller second chamber in farther spaced relation from the first valve seat than the first valve;
   (g) a pair of axially aligned pistons disposed in the first chamber and reciprocable longitudinally thereof, the first piston being closer the first valve seat and spaced from the second piston, the pistons having axially aligned openings extending therethrough and form a third chamber, the pistons, when in a first position longitudinally of the first chamber, placing the first inlet port in communication with the exhaust port via the first and third chambers, and the pistons, when in a second position longitudinally of the first chamber farther from the stationary member, placing the second inlet port in communication with the exhaust port via the second and first chambers, the second piston having a camming surface which is in spiral relation around the longitudinal axis of the valve and which faces the flat friction surface of the stationary member in spaced relation;
   (h) a coil spring disposed in the third chamber and biasing the first and second pistons apart;
   (i) a coil spring surrounding at least a portion of the first piston and biasing the first piston in the direction of the second piston;
   (j) a rotary member extending through the opening of the stationary member into the opening of the second piston, the rotary member including a knob which is disposed exteriorly of the housing and by which the rotary member is rotated, by hand, the rotary member including a radial extension which has, (I) a flat, annular friction surface facing the flat friction surface of the stationary member in spaced relation, and (II) a spiral camming surface for matingly contacting the spiral camming surface of the second piston;
   (k) a pair of annular friction plates disposed between the friction surfaces of the rotary and stationary members, each of the friction plates including a pair of oppositely disposed flat, annular friction surfaces;
   (l) means for keying one of the pair of friction plates to the stationary member for limited rotational movement relative thereto; and
   (m) means for keying the other of the pair of friction plates to the rotary member for limited rotational movement relative thereto.

* * * * *